United States Patent [19]
Haartsen

[11] Patent Number: 5,960,048
[45] Date of Patent: Sep. 28, 1999

[54] METHOD AND AN ARRANGEMENT FOR RECEIVING A SYMBOL SEQUENCE

[75] Inventor: Jacobus Cornelis Haartsen, Staffanstorp, Sweden

[73] Assignee: Telefonaktiebolaget LM Ericsson, Stockholm, Sweden

[21] Appl. No.: 08/826,801

[22] Filed: Mar. 25, 1997

Related U.S. Application Data

[60] Provisional application No. 60/017,759, May 16, 1996.

[30] Foreign Application Priority Data

Mar. 26, 1996 [SE] Sweden .................................. 9601152

[51] Int. Cl.$^6$ ..................................................... H04L 7/00
[52] U.S. Cl. ............................................................ 375/366
[58] Field of Search ................................... 375/340, 343, 375/365, 366, 367; 370/512, 513, 511, 509, 514

[56] References Cited

U.S. PATENT DOCUMENTS

| | | | |
|---|---|---|---|
| 4,347,606 | 8/1982 | Hoogeveen | 370/105 |
| 4,920,546 | 4/1990 | Iguchi et al. | 375/106 |
| 4,930,140 | 5/1990 | Cripps et al. | 375/1 |
| 5,422,916 | 6/1995 | Nall | 375/368 |
| 5,428,647 | 6/1995 | Rasky et al. | 375/366 |
| 5,539,751 | 7/1996 | Sabel | 370/105.4 |
| 5,598,429 | 1/1997 | Marshall | 375/367 |

FOREIGN PATENT DOCUMENTS

| | | |
|---|---|---|
| 676874 | 10/1995 | European Pat. Off. . |
| 680167 | 11/1995 | European Pat. Off. . |

OTHER PUBLICATIONS

International–Type Search Report re: SE 96/00324 Date of mailing of report: Oct. 4, 1996.
Weihua Zhuang, "*An Improved Hybrid PN Code Acquisition for CDMA Personal Wireless Communications*", PIMRC Conference held Sep. 1995, pp. 995–999.

*Primary Examiner*—Tesfaldet Bocure
*Attorney, Agent, or Firm*—Burns, Soane, Swecker & Mathis, L.L.P.

[57] ABSTRACT

The invention relates to synchronizing in communication systems by using a sequential correlation technique. A digital sequence known to the receiver, a so-called signature, is allocated a plurality of segments. The segments are correlated, segment for segment, in a correlator (300) which is equally as long as the segment. The segments may have the same or different bit patterns. When a first segment is received in the correlator (300) and the correlation value of this segment exceeds an associated threshold value, the segment is accepted as received and is saved in a memory (308) in response to a signal from the control unit (311). A timer (319) is set to a time point that corresponds to the length of the segments. There is then correlated a second segment whose correlation value on the signal from the timer (319) is added (304) to the value stored in the memory (308). If the sum exceeds an associated threshold value, the sum is stored in the memory (308). Detection continues in this way. When the sum of the correlation values of all segments have exceeded the threshold value of the last segment, there is generated a sync. time pulse signal (Ts). Should a threshold value not be exceeded, it is assumed that a wrong signature has been received, and detection of the first segment is recommenced.

22 Claims, 11 Drawing Sheets

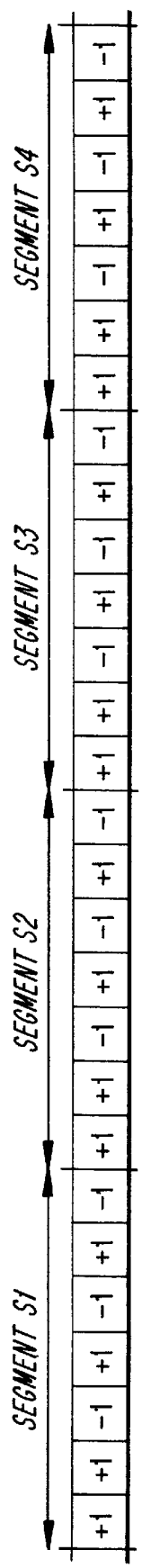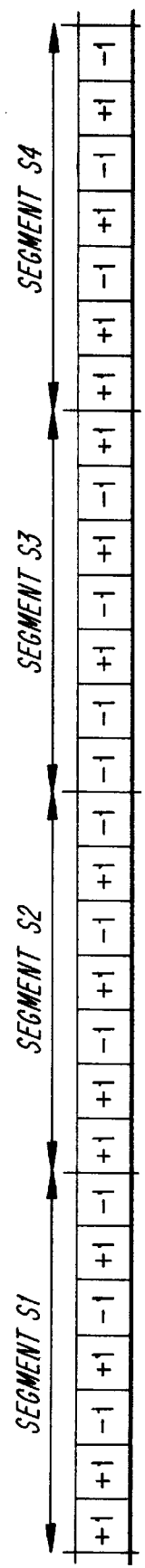

METHOD AND AN ARRANGEMENT FOR RECEIVING A SYMBOL SEQUENCE

This application claims benefit of provisional application No. 60/017,759 filed May 16, 1996.

TECHNICAL FIELD

The present invention relates to a method and to an arrangement for the asynchronous detection of a digital sequence known to a receiver.

DESCRIPTION OF THE BACKGROUND ART

The synchronization of transmitters and receivers is a central part of modern digital communications systems. In wireless digital communications systems, for instance time multiplex systems (TDMA) or code multiplex systems (CDMA), of which the code multiplex system has the two most usual solutions in frequency hopp systems (FHSS) and direct sequence systems (DSSS), it is necessary to mutually synchronize transmitters and receivers so that the receiver will receive the correct time slot in TDMA or the correct code phase in CDMA.

One method of synchronizing transmitters and receivers in digital communications systems is for the transmitter to transmit a digital sequence that is known to the receiver. The receiver lies in a search procedure in which the receiver searches for the known digital sequence. When a digital sequence known to the receiver is found, a sync. time pulse is generated and used as a time reference, therewith synchronizing transmitter and receiver.

The ability to receive a system identification signal is also an application of asynchronous reception. A search procedure in which the receiver searches for known signals is also applied in automatic identification systems. One such automatic identification system is, e.g., Radio Frequency Identification (RFID) with which the location of, e.g., vehicles, employees, criminals and animals can be monitored.

The object to be monitored carries a transmitter which transmits a unique signal. This signal is transmitted at a point in time unknown to the receiver, meaning that the signal is asynchronous and this is registered in the signal upon detection of the known signal.

A well-known technique for the asynchronous reception of the digital sequence known to the receiver involves the use of a correlator which, e.g., can be implemented as a transversal filter where the length of the filter is equal to the length of the known digital sequence. This filter effects correlation of a received digital sequence and the digital sequence earlier known to the receiver, resulting in a value which is proportional to the similarity between the received sequence and the known sequence. In order for a received known digital sequence to be registered, the result of the correlation must exceed a predetermined threshold value.

The performance that can be achieved through the aforedescribed correlation is directly dependent on the length of the known digital sequence. The longer a known digital sequence, the better the performance achieved with the correlation. However, there is a practical upper limit to the length of the transversal filter as long filters result in high power consumption. It is important to keep power consumption at a low level in, e.g., mobile units. Long transversal filters are also complex in implementation.

A drawback with the aforedescribed technique is thus that a long filter results in high power consumption and that its implementation is also complex.

Another drawback with the use of long transversal filters is that their implementation requires a large memory area; the memory area is limited in mobile units.

Still another drawback with the aforedescribed technique is that the length of the known sequence is permanent, i.e. cannot be changed.

U.S. Pat. No. 5,422,916 describes a synchronizing method using a known digital sequence where the ambient surroundings may have influenced the received sequence with a burst of incident noise, such that identification of a known digital sequence requires more than just correlating the received digital sequence and the known digital sequence. A 64-bit sequence derived from a so-called Barker sequence is used as the known digital sequence.

This known method involves comparing the received digital sequence with the known digital sequence so as to count the number of errors in the received digital sequence. If the result exceeds a determined threshold value, the detection process is continued by checking that the number of errors in the received digital sequence does not exceed an upper limit. If such is not the case, the received digital sequence is divided into four parts each consisting of 16 bits. These four parts are linked together two and two, resulting in six new 32-bit words. The number of errors is then calculated in each of these new 32-bit words, and a counter is advanced by one increment for each of the words in which the number of errors does not exceed a specific value. Subsequent to having checked all six words, it is assumed that the known digital sequence has been received when the result in the counter exceeds a specific value.

The known method solely solves the problem concerned with bursts of incident noise, but the problem associated with long correlators and long correlations remains.

In the PIMRC conference held in September 1995, a report was published on a hybrid parallel correlator (An Improved Hybrid PN Code Acquisition for CDMA Personal Wireless Communication, IEEE-95:0-7803-3002-1/95). The hybrid parallel correlator is described in this document, i.e. a mixture of a serial and parallel correlator. The known sequence is divided into segments that are contingent on two construction parameters $N_1$ and $N_2$. These parameters are chosen differently with respect to the desired degree of parallelism ($N_1$) and serialism ($N_2$). The code access time is low when many parallel correlators are used, whereas machine hardware complexity becomes high. The hardware becomes simple when a serial correlator is used, whereas the code access time is long. The method described in said document represents a compromise between parallel and serial correlator. The length M of the segment is chosen in accordance with $M=\theta/(N_1 \times N_2)$, where $\theta$ is the length of the known sequence. Each of the correlators includes one of the M-segments as a correlation segment. When a first segment is found, the system switches from a search mode ($H_0$) to a verification mode ($H_1$). A-tests are carried out in the verification mode, and if B-tests thereof have a correlator output signal which exceeds a set of threshold values, a switch is made to a tracing process. The access process is terminated when the correct code phase is delivered to the code tracing system, otherwise the access process is reactivated when a false code phase is delivered.

The method relates solely to a manner of increasing correlation reception rates and can be applied in systems in which this is critical. The method does not therefore solve the problems which the present invention intends to solve.

SUMMARY OF THE INVENTION

The object of the present invention is to solve the problem associated with the asynchronous detection of a long digital sequence with a correlator whose length is at least the same as the length of the digital sequence. The detection process is carried out with essentially the same high probability as that of a correlator of equal length to the known digital sequence.

Another problem which the invention is intended to solve is one of maintaining power consumption at a low level in the asynchronous reception of the digital sequence.

The invention is also intended to simplify implementation of the correlator used in the asynchronous reception of digital sequences.

In accordance with the present invention, the aforesaid problems are overcome and resolved by dividing the known digital sequence into a predetermined number of segments, each of which is allotted a corresponding threshold value. Correlation with the incoming digital sequence is effected segment-wise and in order for it to be assumed that a segment has been received, it is necessary for the sum of the correlation value of the segment just received and the sum of the correlations earlier carried out to exceed the corresponding threshold value of the segment just received. When all segments are received and the correlation value of the last segment has been added to the sum of the correlation values of earlier segments, said sum giving a final correlation value, exceeds the threshold value corresponding to the last segment, it is assumed that a known digital sequence has been received. A sync. time pulse signal is then generated.

The inventive method is characterized by the characteristic features set forth in Claim 1.

According to one advantageous embodiment of the invention, a latter part of the symbol sequence incoming to the receiver is correlated in a similar manner, while taking into consideration a true symbol sequence that may have arrived later. This embodiment has the characteristic features set forth in Claim 9.

When practicing the inventive method, a correlator in the receiver need only be as long as one segment, thereby resulting in a shorter correlator which, in turn, reduces correlator complexity, memory use and power consumption.

An inventive arrangement for carrying out the method solves the aforesaid problem by virtue of the digital sequence being received in a receiver that comprises a correlator, a control unit, a timer, a memory and an adder. The received digital sequence is divided into a predetermined number of segments and each of the segments has an individual threshold value allotted thereto. The received sequence is correlated segment by segment and each correlation value is added to the sum of all earlier correlation values. In so doing, the magnitude of the sum of the earlier correlation values affects the comparison with the threshold values, i.e. an accumulation effect is obtained. Initially, the correlator awaits the arrival of the first segment. The first segment is assumed to be received, when the correlator output signal exceeds the threshold value that corresponds to the first segment. The correlator output signal for the first segment is saved in one of the memories and one of the timers is loaded with the time point at which the second segment of the correlator signal shall be measured. This time point is the point in time at which the next received digital segment is assumed to have its maximum correlation value. On a signal from a timer, the new correlator output signal is added to the value stored in the memory. This sum shall exceed the threshold value of a combination of first and second segments, and when such is the case said sum is saved in the memory. On the other hand, if the sum does not exceed a corresponding threshold value, the memory is cleared, i.e. set to zero, and the correlator again awaits for the first segment.

The arrangement is therewith characterized by the features evident from Claim 14. Advantageous embodiments of the proposed apparatus have the characteristic features set forth in Claims 15–19.

The aforedescribed procedure is carried out for all segments and if the sum of the correlator output signal and the memory value do not exceed the corresponding threshold value of the segment correlated at that moment in time during reception, the memory is cleared and the correlator again awaits the first segment. When all the segments in the sequence have been received and the sum of the correlation value of the last segment and the value saved in the memory exceeds the corresponding threshold value of the last segment, it is assumed that the entire digital sequence has been received. The control unit then generates the sync. time pulse signal on an output, to indicate that a digital sequence has been received, wherewith a communications link between a transmitter and the receiver can be set up.

The inventive arrangement has the significant advantage of enabling shorter correlators to be used in the detection of a long digital sequence, a so-called signature, for synchronizing a transmitter and a receiver in a radio system or in a data communication system or when detecting an acknowledgement signal for an automatic identification system.

A further advantage afforded by the present invention is that it enables long digital sequences, which give higher probability for correct detection, to be used as a signature without requiring the use of a correlator that is equally as long as the digital sequence.

The purpose of the invention is to enable the use of the digital sequence in a synchronous synchronization while, nevertheless, using a correlator which is shorter than the digital sequence.

Another aim of the present invention is to economize on power consumption in mobile units, by using relatively short correlators.

BRIEF DESCRIPTION OF THE DRAWINGS

The invention will now be described in more detail with reference to exemplifying embodiments thereof and also with reference to the accompanying drawings, in which

FIGS. 4–7 are time diagrams with separate examples of sequence intervals;

DESCRIPTION OF PREFERRED EMBODIMENTS

Figure 1:
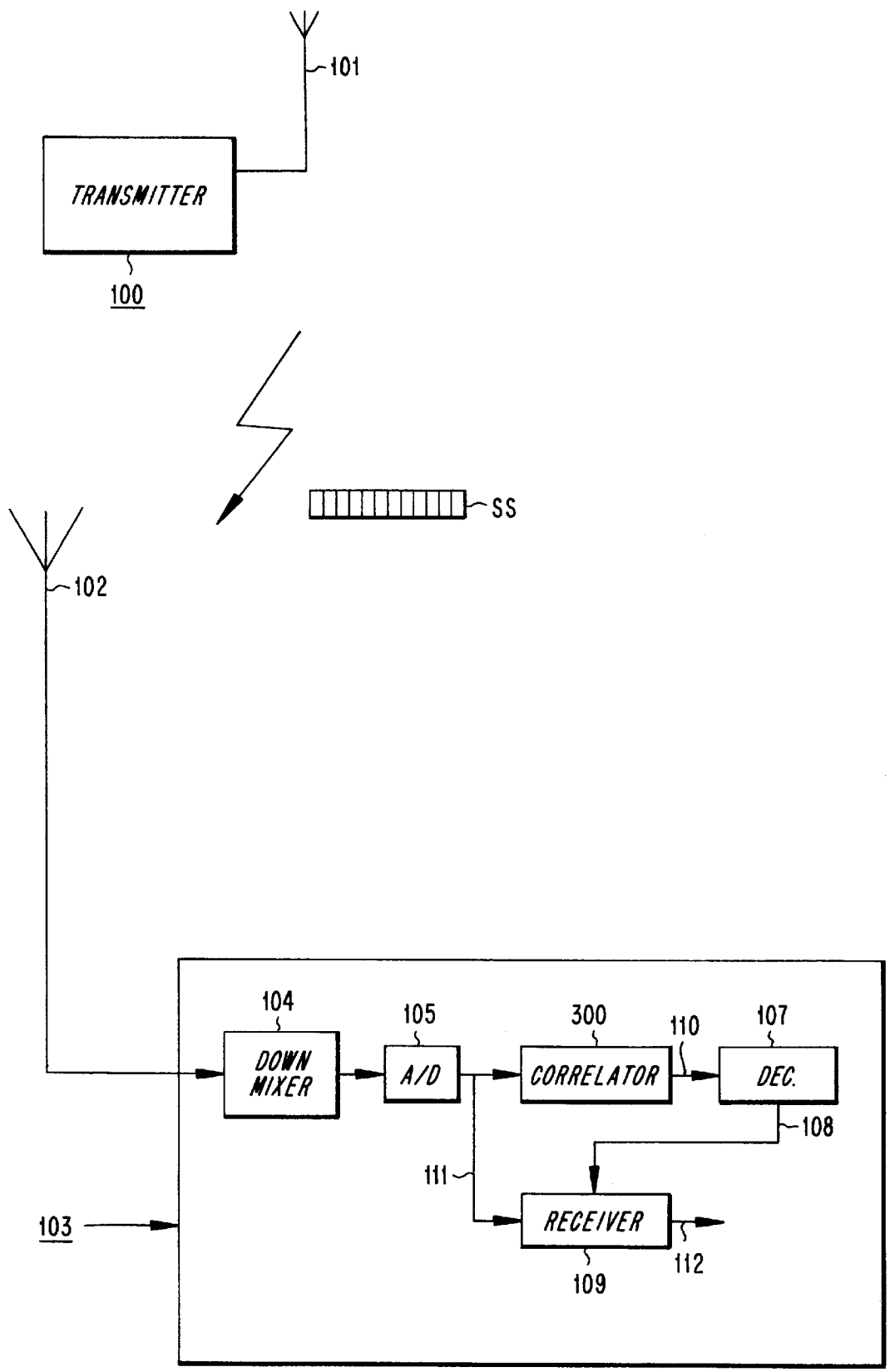
FIG. 1 is a schematic view of a wireless telecommunications system.

FIG. 1 illustrates schematically the manner in which a wireless telecommunications system synchronizes a receiver 103 with a transmitter 100 by receiving synchronously a known symbol sequence SS. The transmitter 100 transmits the sequence known to the receiver 103 via an antenna 101, and the known sequence SS is received in a distorted state by an antenna 102 connected to the receiver 103. The received sequence SS passes through a down-mixer 104, an A/D converter 105 and into a correlator 300 as the known symbol sequence in digital form although distorted as a result of inadequacies of the transmission medium. The correlator 300 and a decision-making unit 107 are in a search mode, i.e. await the known digital sequence SS which, upon detection in the receiver 103, functions to initiate a sync. time pulse signal 108. In the search mode, the correlator 300 delivers a correlation value 110 to the decision-making unit 107, which compares the correlation value with a predetermined value. When the known digital symbol sequence SS is received in the correlator 300, the correlation value 110 will exceed the predetermined value. The decision-making unit 107 then sends the sync. time pulse signal 108 to a receiver unit 109 in which an information carrying radio signal sent from the transmitter 100 is demodulated. The receiver 103 therewith obtains the same time reference as the transmitter 100 and a communications link can then be set up. When the communications link is set up, there is processed a message 111 that has been received through RF demodulation (down-mixing in 104) of a radio signal received from the transmitter 100, and thereafter A/D converted in 105. The receiver 109 generates an output signal 112 which constitutes the desired message.

Figure 2:
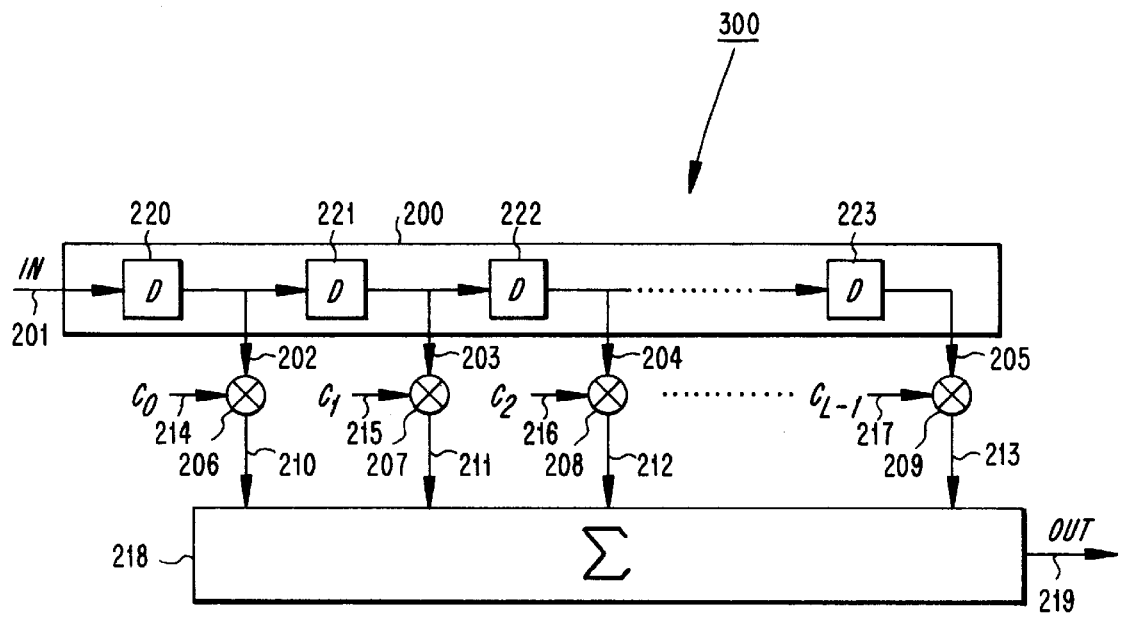
FIG. 2 is a block schematic illustrating a correlator implemented as a transversal filter.

FIG. 2 illustrates the manner in which a correlator, for instance the correlator 300, can be implemented with a transversal filter in a known manner. A correlator of this kind is used in many contexts within wireless telecommunication and data communication, among other things for receiving a digital sequence synchronously, and upon acknowledgement of the received digital sequence the sync. time pulse signal 108 is generated by a decision-making unit in the receiver, so as to synchronize transmitter and receiver one to the other.

The transversal filter includes a shift register 200 having an input 201 and a predetermined number of time delay units 220, 221, 222, 223 having outputs 202, 203, 204, 205, and a predetermined number of multipliers 206, 207, 208, 209, each having two inputs and one output 210, 211, 212, 213, of which one input on each multiplier is connected to its respective shift register output 202, 203, 204, 205. The other input 214, 215, 216, 217 of each multiplier is connected to a correlation sequence having correlation coefficients $C_0$, $C_1$, $C_2$, . . . , $C_{L-1}$, these being the known digital sequence stored in the receiver. The filter has a summation unit 218 having one output 219 and a specific number of inputs, each of said inputs being connected to a respective output 210, 211, 212, 213 of the multipliers 206, 207, 208, 209.

This correlator functions to correlate a received digital sequence and a correlator known sequence. For each received digital sequence, there is obtained on the output 219 of the summation unit 218 a signal which is proportional to said correlation between the received and the known digital sequence.

The received digital sequence is shifted bit by bit in the time delay units 220, 221, 222, 223 via the shift register input 201. Subsequent to each shift, the correlation coefficients $C_0$, $C_1$, $C_2$, . . . , $C_{L-1}$ are multiplied by that part of the sequence that has been shifted into the shift register 200. The result of all multiplications is laid out on the outputs 210, 211, 212, 213 and added in the summation unit 218, which then sends the summation value on the output 219. This can be described mathematically as convolution sum; when the output signal on the output 219 is designated r(k), and the correlation coefficients are designated $C_i$ and the received digital sequence is designated x(i), the following relationship will apply:

$$r(k) = \sum_{i=0}^{L-1} C_i \times \chi(k - i)$$

The length L of the filter, i.e. the number of time delay units 220, 221, 222, 223 in the shift register and the number of multipliers 206, 207, 208, 209, is chosen to correspond to the number of bits in the known sequence. When choosing binary representation consisting, e.g., of −1/+1 and when the received digital sequence and the known digital sequence are mutually the same, there is obtained on the output 219 of the summation unit a signal which is equal to L, i.e. equal to the length of the received digital sequence.

The correlator output signal will seldom reach the maximum value L when correlating in the presence of noise. It is therefore necessary to decide the threshold value at which it is assumed that the received digital sequence will be sufficiently like the known digital sequence and therewith accept the received digital sequence as a sync. signal. A sync. signal which corresponds to a received digital sequence is sometimes also referred to as a signature.

There are at least three important considerations that must be made for the asynchronous reception of the known digital sequence with a correlator. Firstly, when a signature is found in a received sequence, it must be possible to detect the signature with a high degree of probability. The probability of missing the transmitted signature defines what is designated as False Reject rate (FR). The sequence is received but the signature is not detected due to error, for instance interference or noise. Secondly, the correlator output signal must not exceed the predetermined threshold value when a random correlator input signal likens the signature. The probability of the correlator detecting the signature in random noise defines what is designated False Alarm rate (FA). Thirdly, when synchronizing, it is highly important that the selected signature has good auto-properties and cross-correlation properties, i.e. the correlation value shall only be high when matching the received sequence and the known sequence and shall be low for all other shifts between the received sequence and the known sequence. Thus, a distinct peak shall be obtained when the received sequence exactly matches the known sequence.

The FA-rate and the FR-rate values are dependent on the predetermined threshold value that must be exceeded by the correlation value in order for a sync. time pulse to be generated by the decision-making unit 107, this threshold value being defined by the number of bits that must be correct in a received digital sequence in comparison with the known digital sequence. When the threshold value is chosen close to the length L of the signature, e.g. L−2, the FR-rate will have a high value since only a few errors in the received digital sequence in comparison with the known digital sequence, in the example two errors, will result in rejection of the detection. On the other hand, if a low threshold value is chosen, e.g. 5, the FA-rate will have a high value since only a few correct bits in the received digital sequence, in the illustrated case 5 correct bits, will result in a sync. time pulse. There is thus found a threshold value at which FA-rate and FR-rate are minimal. The value of FA-rate and FR-rate when said rates are simultaneously minimal, will depend on the length L of the signature. The longer the signature, the lower the FA-rate and FR-rate at the same time. Similarly, the auto-properties and cross-correlation properties of the signature are dependent on the length of the signature. The longer the signature, the better the auto-properties and cross-correlation properties possessed thereby. However, there is an upper practical limit to the length of the signature, because long signatures require long correlators, these correlators being difficult to implement and have a high power consumption.

Although the present invention uses a short correlator, this correlator has essentially the same properties as a long correlator. This is achieved by dividing the known digital sequence into a predetermined number of segments S1, S2, . . . , Sn, and by virtue of the length of the correlator used to receive the signature corresponding to the length of the longest segment. Correlation is then effected segment-wise, wherein each of the segments has a corresponding threshold value TV1, TV2, . . . , TVn. When the first segment S1 is received and the segment correlation value a1 has exceeded its corresponding threshold value TV1, the correlation value a1 is loaded into a memory. The second segment S2 is then awaited and when said second segment is received, the stored value a1 is added to the threshold value a2 of the second segment. The result of this addition, a summation value a1+a2, must exceed the threshold value TV2 corresponding to said second segment if the second segment S2 shall be considered to have been received. The sync. time pulse signal is generated when all the segments are received and the sum of the correlation values a1, a2, . . . , an of the segments has exceeded its corresponding threshold value TVn. If the sum of earlier correlation values a1+a2+ . . . +a(m−1) added to the correlation value am of the latest correlated segment Sm do not exceed the threshold value TVm corresponding to the latest correlated segment, earlier received segments are rejected and the first segment S1 is again awaited.

Figure 4:
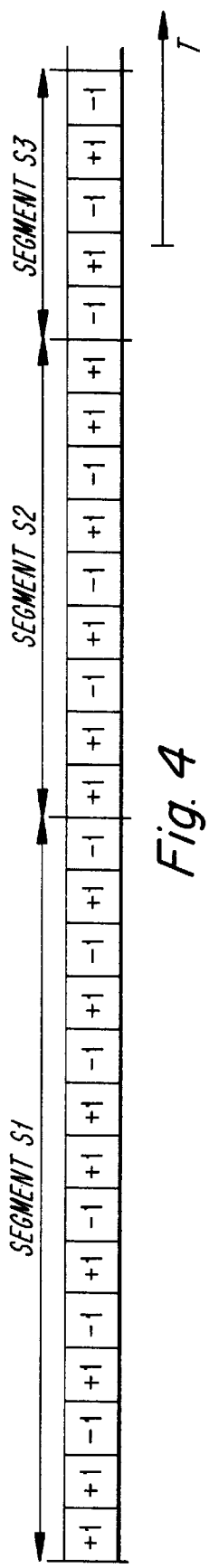
Figure 5A:
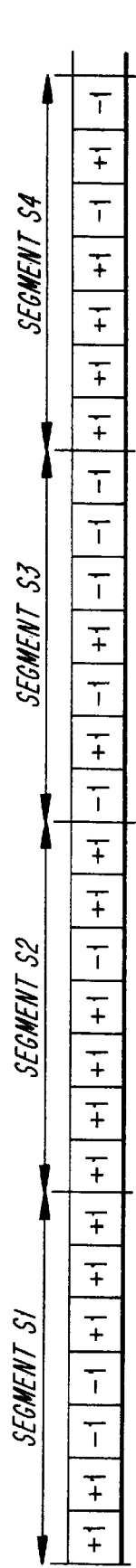

FIGS. 4, 5a, 6 and 7 illustrate a few examples of how a sequence can be divided into segments. Time is referenced T in the Figures. The first segment in the sequence is designated S1, the second segment in the sequence is designated S2, and so on. FIG. 4 illustrates an example of how a sequence is divided into three segments of mutually different lengths, while FIG. 5a shows how a sequence is divided into three segments of equal lengths and having different bit patterns. FIG. 6 shows a sequence divided into four segments of equal lengths and having mutually the same bit patterns, and FIG. 7 shows a sequence having four segments of equal length and mutually equal bit patterns with the exception of segment S3 which is inverted in relation to the other segments. The binary bit pattern of a segment can be chosen in different ways. The bits may be randomly distributed or may be selected as a sequence that has good autoproperties and cross-correlation properties, for instance a maximum length code, a so-called Barker sequence, a so-called Gold sequence or some other sequence that has desired properties. The different segments in FIG. 7 are inverted relative to one another and this segment inversion can also be chosen in different ways. The segment inversion may be random or can be selected a sequence that has good autoproperties and cross-correlation properties as, e.g., a maximum length code, a Barker sequence, a Gold sequence or some other sequence having desired properties. With segment inversion, there is obtained in the detection process a further correlator which is designated a segment correlator. This segment inversion can also be expanded to still more levels, such as to obtain a multi-sequence composed of several of the aforedescribed segment inversions. Several multi-sequences are combined to form a super-sequence and several super-sequences are combined to form a hyper-sequence. By dividing the known sequence into these levels, there are obtained five correlators, which further improve the auto-properties and cross-correlation properties of the sequence.

In order to obtain sufficiently good auto-properties and cross-correlation properties for the synchronizing sequence in a noisy atmosphere, the sequence will preferably include at least 64 bits. Examples of lengths used in a sequence for synchronization, it can be mentioned that GSM uses a synchronizing sequence which consists of 64 bits of a synchronizing burst on a synchronizing channel (SCH); the CODIT project (CDMA) uses a spread sequence on a control channel (PCCH) that has a length of 255 bits; IS-95, which is a CDMA system from QUALCOMM, uses spread sequences that include 64 and 32768 bits.

Figure 3:
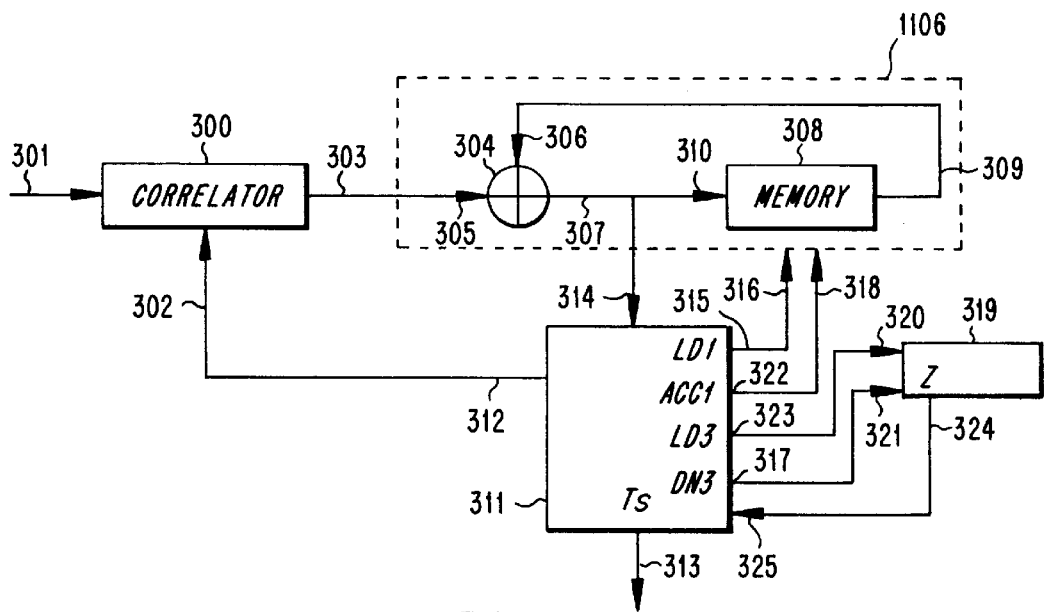
FIG. 3 is a block schematic illustrating an inventive sequential correlator.

FIG. 3 illustrates an embodiment of an inventive arrangement. A correlator 300 has an input 301, a coefficient input 302, and an output 303. The input 302 is a collective designation for the inputs 214–217 of the FIG. 2 illustration. An input 305 to an adder 304 is connected to the output 303 of the correlator, said adder having a further input 306 and an output 307. A memory 308 has a plurality of inputs and one output 309, wherein an input 310 is connected to the output 307 of the adder. A control unit 311 has a plurality of inputs and outputs, wherein an output 312 is connected to the coefficient input 302 on the correlator 300, another output 313 produces the sync. time pulse signal Ts, one input 314 is connected to the output 307 on the adder 304, one output 315 is connected to an input 316 on the memory 308, and one output 322 is connected to an input 318 of the memory 308. A timer 319 has a plurality of inputs and outputs, wherein one input 320 is connected to an output 323 on the control unit, one input 321 is connected to an output 317 on the control unit, and one output 324 is connected to an input 325 on the control unit.

In order for the arrangement to function, it is necessary to provide the arrangement to include a central clock. This clock is not shown in any Figure. Synchronized logic is also a prerequisite, and it is necessary that all units are clocked with the central unit. The arrangement can either be synchronized on up-pulse edges or down-pulse edges of a pulse in a pulse train from the central clock. Signals that are sent between different units in the arrangement have correspondence in outputs which become active, i.e. change levels, wherein this change in level is detected on the inputs upon a first obtained clock pulse edge (up or down edge) from the central clock.

The correlator 300 is arranged to receive a digital segment on its input 301 and to produce on its output 303 an output signal which is proportional to the correlational between the received digital segment and the known digital segment. The input 302 of the correlator 300 is arranged to deliver the various correlation coefficients $C_0, C_1, \ldots, C_{LS-1}$ to the correlator 300, these correlation coefficients being the bit pattern of the known digital segment. The adder 304 functions to add a value on its one input 306 and delivered from the output 309 of the memory 308 to the correlation value on its other input 305, delivered from the output 303 of the correlator 300. A result of the addition is obtained on the output 307. The adder 304 and the memory 308 together form an accumulator 1106. The control unit 311 is constructed to control correlation of all segments, which are predetermined in number, length and configuration. The control unit 311 thus has information relating to corresponding threshold values of the segments and how the known digital sequence is constructed, i.e. the number of segments, the lengths of the segments and the bit patterns of said segments. The input 314 of the control unit is connected to the input 307 of the adder for comparison of the value delivered by the output 307 with the predetermined threshold value, this threshold value belonging to the segment whose correlation value was added last in the adder 304. Prior to the receipt and acceptance of the first segment S1 by the control unit 311, the output 315 lies active with a signal LD1. When the output 315, which is connected to the memory input 316, is active the correlation value is loaded directly into the memory without addition. The signal LD1 is used when an addition of the correlation value and the value in the memory is not necessary. The signal LD1 remains active when the value on the input 314 does not exceed the threshold value, meaning that the value stored in the memory will be written over by the next correlation value from the correlator 300. The timer 319 functions to receive on its input 320 a signal LD3 from the control unit 311, this signal initiating a predetermined timer start value whose magnitude is proportional to the length of the next arriving segment. For instance, if the next arriving segment consists of 30 bits, the timer 319 is loaded with 30. The start value is counted down to 0, by reducing said value by one (1) each time the control unit output 323 (DN3) connected to the timer input 321 is active and the timer receives, at the same time, a clock pulse edge from the central clock. The timer 319 sends a signal Z on output 324 to the control unit 311 when the next correlation value is to be added to the value in the memory 308, i.e. when the timer reaches the value 0 and the latest correlation value shall thereafter be compared with its corresponding threshold value. Because the correlation value of the next arriving segment is expected to be maximal when the whole of the received segment is shifted in the shift register of the correlator, all other correlation values are of no interest during this shifting of the segment, and the arrangement therewith waits before adding the correlation value of the next arriving segment to the value stored in said memory until the correlation value of the segment is maximal. The control unit 311 is also constructed to receive on the input 325 the signal S from the output 324 of the timer, said signal Z initiating a signal ACC1 from the control unit output 322 to the memory input 318. In turn, the signal ACC1 initiates an addition procedure in the adder 304 and thereafter a comparison of the value on input 314 on the control unit 311 with a corresponding threshold value pre-stored in the control unit. The control unit 311 can make three possible decisions after said comparison. 1) If the value exceeds a corresponding threshold value and the last segment has been received, the following signals are generated: the sync. time pulse signal Ts from the control unit 311 on output 313, the signal LD1 on output 315 and the correlation coefficients of the first segment on output 312. 2) If the value exceeds a corresponding threshold value and it is not the last segment that is received, the control unit 311 generates the correlation coefficients of the next arriving segment on the output 312. The timer is also initiated with the length of the next arriving segment. 3) If the value does not exceed a corresponding threshold value, there is generated: the signal LD1 from the control unit 311 on the output 315 and the correlation coefficients for the first segment S1 on the output 312. The memory 308 is constructed to receive on its input 316 the signal LD1 which causes the correlation value to be loaded directly into the memory 308 via the input 310, without adding the correlation value and the memory stored value. The memory 308 is also designed to receive the signal ACC1, this signal initiating addition of the correlation value and the memory stored value in the adder 304 and loading the result into the memory. A given correlation value or the sum of a number of correlation values may also be equal to or exceed its corresponding threshold value. The essential thing is that they correspond to a threshold value associated with the correlation value or the sum of a number of correlation values.

Figure 5B:
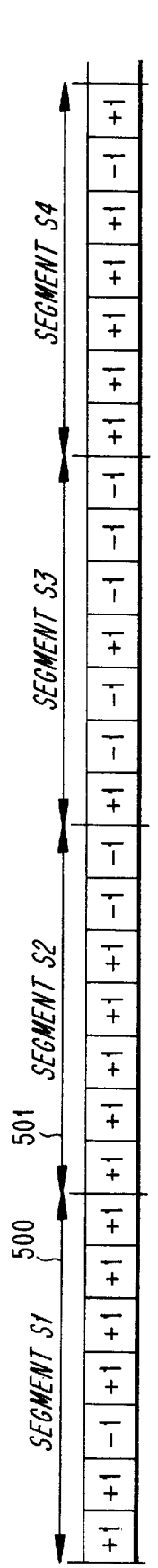

FIG. 5b illustrates the configuration of a received digital sequence, while FIG. 5a illustrates the corresponding known digital sequence. The events that take place when the received digital sequence according to 5b is received and the known digital sequence according to 5a is expected will now be described in more detail. When the digital sequence shown in 5a is used for synchronization, the correlator 300 will have a length of L=7 because a segment is 7 bits long. Let it be assumed that it has been predetermined that segment S1 will have the threshold value TV1=3, segment S2 will have the threshold value TV2=4, segment S3 will have the threshold value TV3=7 and segment S4 will have the threshold value TV4=9. The choice of the threshold values TV1,TV2,TV3,TV4 implies that in order for a threshold value to be exceeded one is dependent on the earlier correlation value, which shall now be shown. The correlator has received the correlation coefficients $(C_0,C_1,C_2,C_3,C_4,C_5,C_7)=(+1,+1,-1,-1.+1,+1,+1)$ for segment S1 in FIG. 5a and then awaits the first segment S1. The output 315 on the control unit 311 lies active, meaning that the correlation values are loaded directly into the memory 308 and compared in the control unit 311. The output signal 303 will not achieve a value equal to 5 until the whole of the first segment S1 of the received digital sequence in FIG. 5b is shifted in the correlator, because only bit $C_3$ in the first segment is in error, said value being the correlation value a1=5 for S1 and being greater than the threshold value TV1=3 belonging to S1. The fact that the correlator output signal 303 is greater than the threshold value TV1 of the first segment S1 is discovered in the control unit 311 and the control unit sends the signal LD3 to the timer 319 to initiate loading of the earlier mentioned start value. The timer start values are generally of mutually different magnitudes, said magnitudes being contingent on the length of the next arriving segment. In the illustrated embodiment, all segments have the length 7 and the timer start value in the illustrated case is also 7. The control unit 311 also sends out the new correlation coefficients for S2 (shown in FIG. 5a) to the correlator via the correlator input 302. The timer 319 counts down with one increment each time the output DN3 on the control unit is active, at the same time as the timer receives a clock pulse edge from the central clock. When the timer reaches 0, which corresponds to expecting the correlator output signal 303 for S2 to reach its highest value, the timer 319 sends the signal S to the control unit 311. In turn, the control unit 311 sends the signal ACC1 to the memory 308, so as to initiate addition of the correlation value a2 for S2 and the memory-stored value, this value being the correlation value a1 of the first segment S1, which is equal to 5. The addition is effected in the adder 304 and results in a1+a2=6, since S2 in FIG. 5b has three error bits which give the correlation value a2 equal to 1. The value a1+a2=6 is loaded into the memory 308. The threshold value TV2 for S2 is determined as 4, meaning that it is assumed that S2 has been received, and the timer 319 is therewith loaded with the start value that corresponds to the length of S3. The next addition to be made is for the correlation value a3 of S3 and the memory stored value a1+a2, which is now 6. The result of the addition is a1+a2+a3=9, which is higher than the threshold value TV3 corresponding to S3. The next addition is between the correlation value a4 of S4, which is 1, and the memory stored value, which is 9, resulting in the sum a1+a2+a3+a4=10, which is higher than the threshold value TV4=9 of the last segment S4, and the control unit 311 consequently generates the sync. time pulse signal Ts on the output 313.

When the bit patterns of respective segments are mutually the same and have good auto-properties and good cross-correlation properties, the individual segments will have good autoproperties and good cross-correlation properties whereas the full signature will not have good auto-properties and good cross-correlation properties. This may be because the sync. time pulse signal Ts has been generated one or more segments too early or too late. This will be explained by an example. Assume that we have five segments, each containing 30 bits, giving a signature length of 150, and that the last threshold value for generating a sync. time pulse signal is 110. Also assume that the first segment contains a lot of noise and is missed completely, and that the next arriving segments are faultless when received. When the arrangement receives the second segment, it indicates that it is the first segment and when the arrangement indicates in time that it is the fifth segment that is received, it is in actual fact noise that is received. The whole of the reception is thus displaced one segment. However, because four faultiness segments are received (the second segment up to and including the fifth segment in the correct sequence), meaning that the sum 30+30+30+30=120 has already been obtained, the sync. time pulse signal will be generated, although at a time corresponding to the length of one segment too late. A check is made to ascertain that all segments have been correctly received, by determining a coding on segment level, and the sync. time pulse signal is obtained at the right time point, i.e. when the last segment in the sequence is detected. This segment coding is effected by inverting one or more segments in relation to the remaining segments, which provides further correlation, although on a segment level. FIG. 7 illustrates an example of such segment coding.

Figure 9:
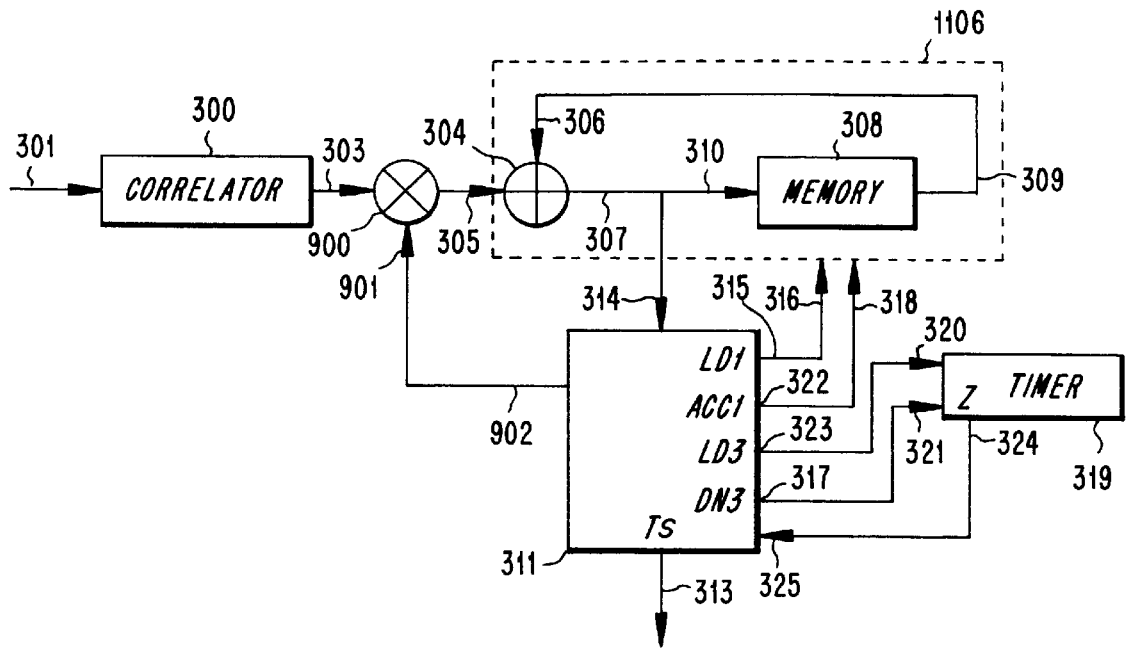
FIG. 9 is a block schematic illustrating another embodiment of the inventive sequential correlator.

FIG. 9 illustrates an embodiment of an inventive arrangement in which there are received known digital segments which have been allocated the same bit patterns with inverted and non-inverted versions, for synchronization of the transmitter and receiver. The arrangement shown in FIG. 9 differs from the arrangement shown in FIG. 3 by virtue of being provided with a multiplier 900 between the correlator 300 and the adder 304, and by virtue of the control unit 311 not being connected to the correlator 300, as the same correlation coefficients are used for all segments. When an inverted segment is correlated in the correlator 300 with the correlation coefficients intended for a non-inverted segment, there is obtained an output signal whose value is equally as great as a non-inverted segment although with a negative value. An output 902 on the control unit is connected to an input 901 on the multiplier. The control unit 311 delivers to the multiplier 900 +1 and −1 in an order such that positive correlation values are obtained. When an inverted segment is to be correlated, the control unit delivers −1 to the multiplier, resulting in a positive correlation value for the inverted segment, while when a non-inverted segment is to be correlated the control unit delivers +1 to the multiplier. When the segments are received in error, negative correlation values are obtained downstream of the multiplier. If a negative correlation value is obtained downstream of the multiplier 900, this affects the newly commenced detection process, because the negative correlation value is added to the value stored in the memory 308, which results in a sum which is smaller than the earlier stored value. This means that the total sum of the correlation value will not exceed its corresponding threshold value and the detection process is therefore recommenced with segment S1. The FIG. 9 arrangement functions in other respects in the same way as the FIG. 3 arrangement. The control unit contains information as to which threshold value each of the segments shall exceed and also whether it is +1 or −1 that is associated with the segments. A segment correlator is obtained with this multiplier.

Figure 10:
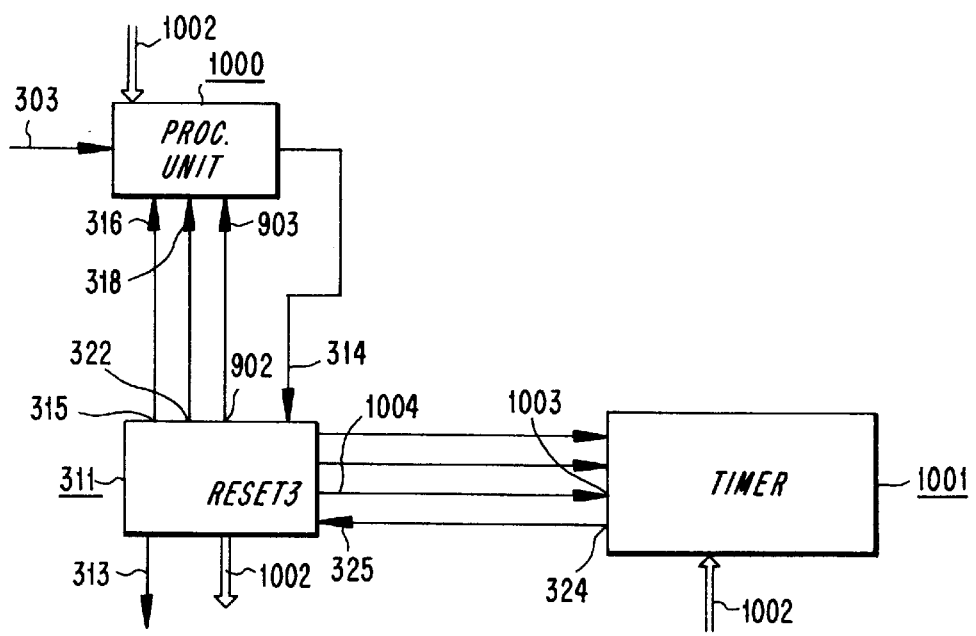
FIG. 10 is a block schematic illustrating another example of the sequential correlator.

FIG. 10 illustrates a further embodiment of part of the inventive correlator. This arrangement includes a specified number of counters, memories and timers for receiving signatures simultaneously. The use of only one counter, one memory and one timer may cause the signature transmitted by the transmitter to be missed, since the arrangement is "passive" when segment S1 is accepted, i.e. awaits segment S2, and may not therefore detect another signature. For instance, if it is misled by noise to believe that segment S1 has been received and the correct signature arrives during the "passive time" of the arrangement, the arrangement will not detect the correct signal since it awaits segment S2 for the wrong signature. When several counters, timers and memories are used instead, it is possible to process several possible signatures at the same time. The use of several counters, memories and timers also enables a low threshold value to be determined for the first segment S1 without needing to miss any segment due to false alarms. The arrangement shown in FIG. 10 includes a unit 1000, a specific number of memories 308, adders 304 and multipliers 900 and a timer unit 1001 which contains all timers 319. The same signal set-up as that earlier described is used, wherewith the principle is the same as that earlier described although the various memories, inverters, adders and timers are initiated to receive a signal by virtue of their addresses being sent out on an address bus 1002. The illustrated signal RESET3, however, is new, this signal being a global reset signal which is transmitted when the received signature fulfils the condition that the sync. time pulse signal shall be sent.

The inventive arrangements earlier described with reference to FIGS. 3 and 9 will now be described in more detail with reference to FIGS. 11 and 12.

Figure 11:
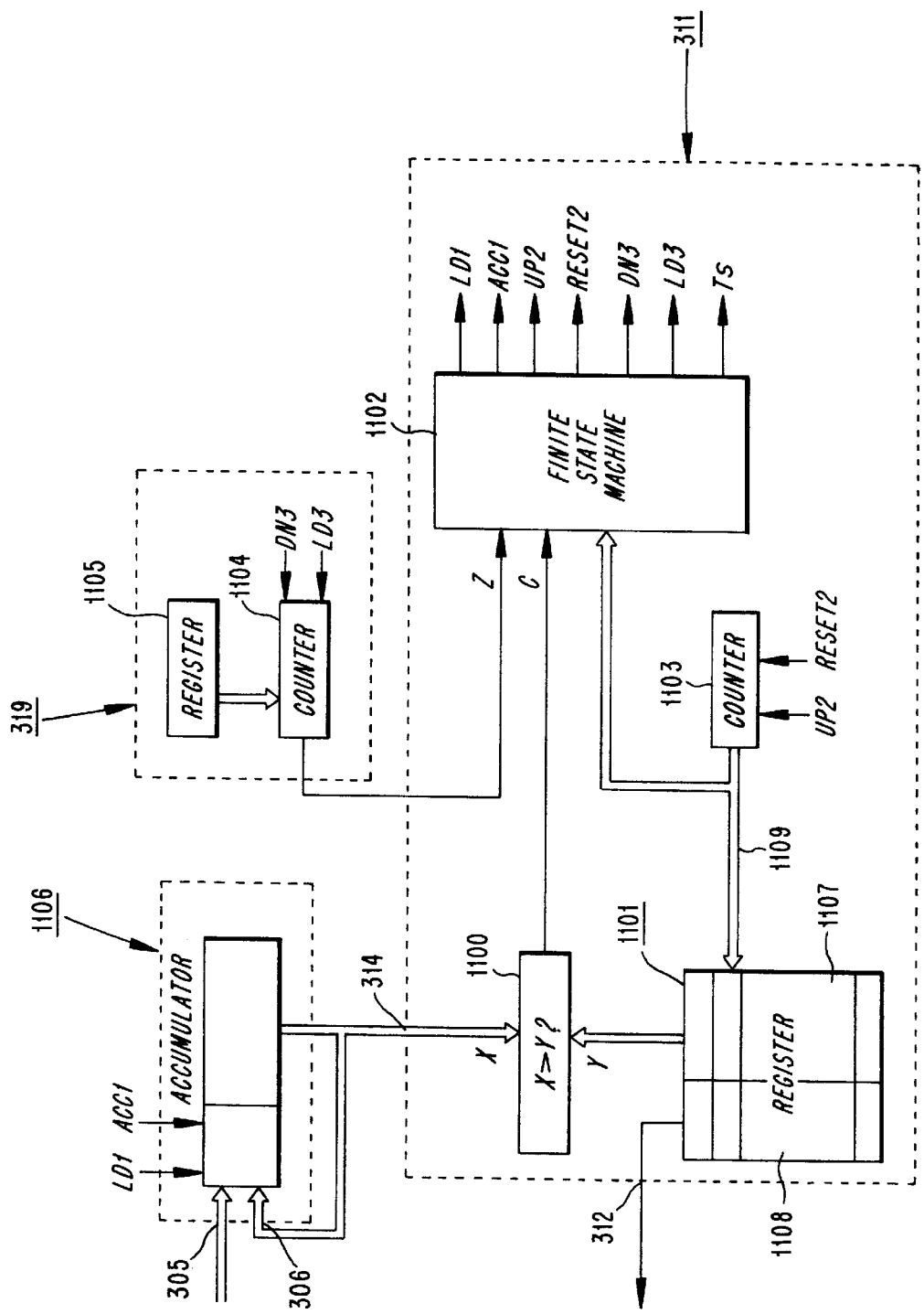
FIG. 11 is a more detailed block schematic illustrating a control unit, a timer, an adder and a memory.

FIG. 11 illustrates the control unit 311, the timer 319, the memory 308 and the adder 304 in a more detailed block schematic. Thus, FIG. 11 is a more detailed block schematic of the arrangement in FIG. 3, although the correlator is not included. The control unit 311 includes a comparator 1100 which delivers an output signal C to a finite state machine 1102. This output signal C is contingent on the ratio between an input signal X, which is the adder output signal, and an input signal Y, which is the corresponding threshold value. This threshold value 1107 is distributed from a register 1101 in the control unit 311. The control unit 311 also includes a counter 1103 which counts up each time an output UP2 on the finite state machine connected to an input UP2 on the counter 1103 is active at the same time as the counter 1103 receives a clock pulse edge from the central clock. the output UP2 becomes active after each accepted segment. The counter 1103 sends to the register 1101 and the finite state machine 1102 a segment number 1109 so that said register and machine are aware of which segment is to be processed. The finite state machine may be implemented as a combinatory network (i.e. logic NOT-AND and NOT-OR gates), or with a ROM-memory that decides which control signals shall be sent. The decision is made in accordance with the value of input signals Z, C and segment number. The timer 319 includes a counter 1104 and at least one register 1105. The register 1105 contains the start values for timer 319 and these start values are loaded down to the counter 1104 on the signal LD3 from the finite state machine. The counter 1104 is counted down to 0 with the signal DN3 from the finite state machine 1102 and when at 0 delivers the signal Z to said finite state machine. The finite state machine then sends the signal ACC1 to the memory 308, for addition of the memory stored value to the correlation value. Different signals are sent from the finite state machine 1102, in accordance with the result obtained with the comparison. If the relation X>Y is fulfilled, the signal UP2 is transmitted, this signal stepping up the counter by one increment, whereby the new value of the counter 1103 will be the number of the next arriving segment. The counter 1103 keeps an account of that segment which is next in line for correlation and comparison. New correlation coefficients 1108 stored in the register 1101 are also sent to the correlator 300 when the counter 1103 has stepped up. The signal LD3 is also sent from the control unit to the counter 1105, for charging the counter 1104 with a new start value. If the relation X>Y is not fulfilled, the signal RESET2 is sent to set the counter 1103 to zero. The signal LD1 is sent from the finite state machine 1102 to the memory, for loading the correlation value directly into the memory. The signal LD1 is used when the first segment S1 shall be detected. The sync. time pulse signal Ts is sent when the last segment is correlated and the relation X>Y is fulfilled. The adder 304 and the memory 308 are implemented in common with an accumulator 1106.

Figure 12:
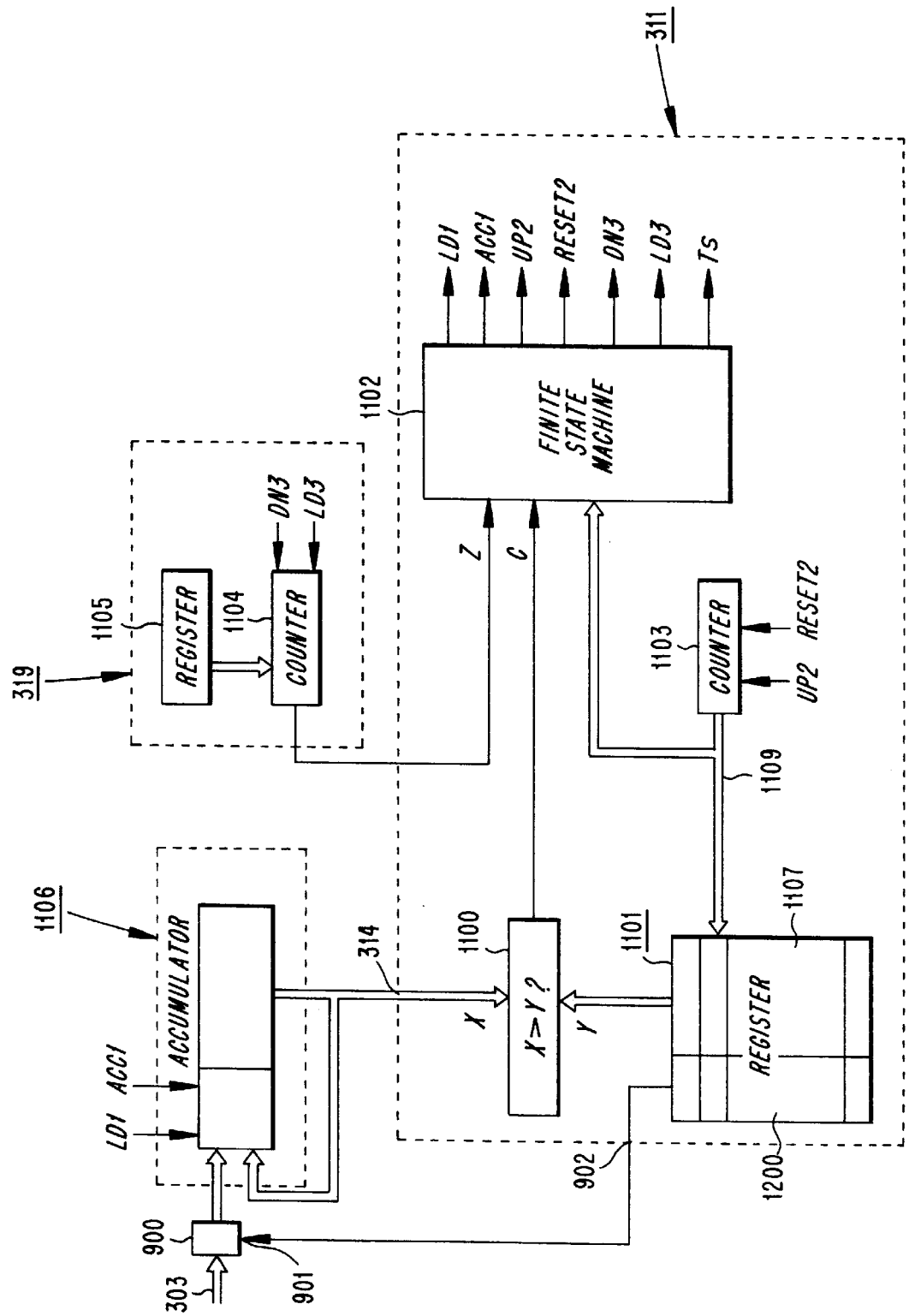
FIG. 12 is another more detailed block schematic of the control unit, timer, adder and memory.

FIG. 12 illustrates an embodiment of the control unit 311 of the embodiment illustrated in FIG. 9. The difference between the embodiment of FIG. 11 and the embodiment of FIG. 12 is that the register 1101 contains inversion coefficients 1200 of inverter 900, so that a positive correlation value will always be obtained in the adder 304. This embodiment uses like or inverted segments, therewith rendering it unnecessary for the control unit 311 to send out new correlation coefficients.

Figure 8:
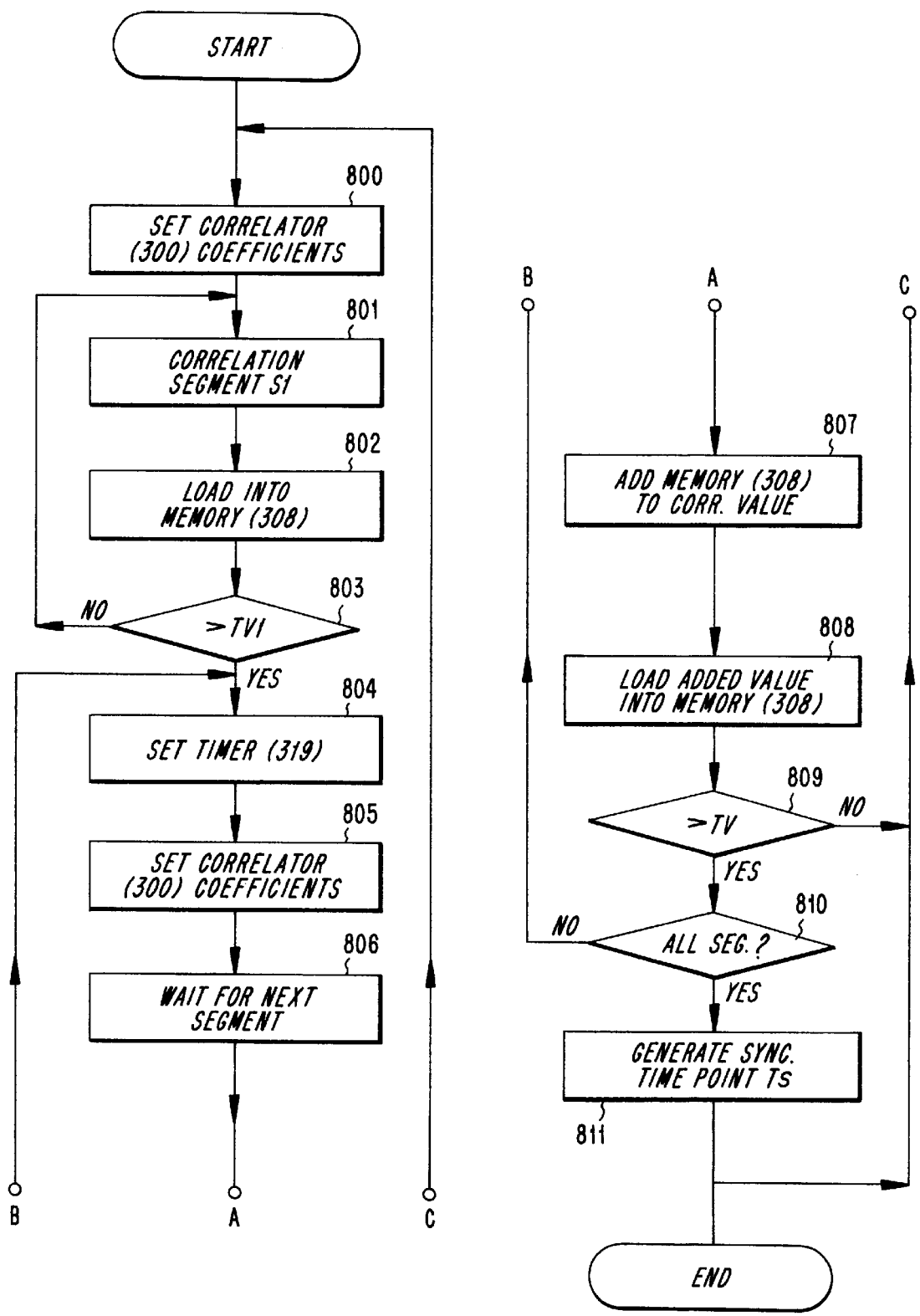
FIG. 8 is a flowsheet illustrating the sequential correlation procedure.

A flowsheet, FIG. 8, illustrates the procedure used by the arrangement shown in FIG. 3 when detecting the sequence known to the receiver, this detection being effected by correlating in segments. Firstly, the correlation coefficients $C_0, C_1, \ldots, C_{LS-1}$ are set in the correlator in their predetermined values in a stage 800, said correlation coefficients corresponding to the first known segment S1. The first segment 500 is then correlated for the received sequence in a step 801. The correlation value a1 of the first segment S1 is loaded into the memory 308 in a step 802. A comparison is then made between the correlation value a1 and the threshold value TV1 corresponding to the first segment S1, in a step 803. If the correlation value a1 does not exceed the threshold value TV1, according to a No alternative, signifying that the first known segment S1 is considered not to have been received, the correlation is repeated in step 801 with the same correlation coefficients, and a new attempt is made to find the first segment S1. If the correlation value exceeds the threshold value TV1, in accordance with a Yes alternative, this signifies that the first segment S1 is considered to have been received and, in a step 804, the timer 319 is set to the time point t1a at which the correlation value a2 of the second segment S2 is assumed to reach its maximum value, this correlation value a2 then being added to the correlation value a1 stored in the memory. The time point t1a at which it is assumed the correlation value of the second segment will have reached its maximum value is the time at which the entire second segment 501 has been shifted into the shift register 200. The correlation coefficients of the second known segment S2 are sent to the correlator in a step 805. The procedure is now passive and, in a step 806, lies in wait for the timer 319 to signal that the correlation value a2 of the second segment shall be added to the value a1 in the memory 308. The correlation value a2 of the second segment S2 is added to the value a1 in the memory 308 in a step 807. The sum a1+a2 is then loaded into the memory in a step 808. The sum a1+a2 of this addition is compared in a step 809. If, in accordance with a No alternative, the sum a1+a2 does not exceed the corresponding threshold value TV2 of the second segment S2, the procedure returns to step 800. On the other hand, if the sum a1+a2 exceeds the threshold value TV2 corresponding to the second segment S2 in accordance with a Yes alternative, a check is carried out in step 810 to ascertain that all segments of the known digital sequence have been received. If not all segments have been received, in accordance with a No alternative, the procedure returns to step 804. The procedure is repeated from step 804 to step 810 provided that the sum a1+a2 . . . +a1+am of the correlation value am of a segment and the value a1+a2 . . . +a1 stored at that moment in the memory exceeds the threshold value TVm corresponding to the segment. If all segments have been received in accordance with a Yes alternative, and all threshold values TV1, . . . , TVn have been exceeded in step 809, it is considered that a known digital sequence, i.e. a signature, has been received. In this regard, the sync. time pulse signal Ts is generated in a step 811 and used in synchronizing transmitter 100 with receiver 103. The procedure is therewith complete and a return can be made to step 800, where a new signature is awaited. The letters A, B and C are used simply to identify corresponding points in the flowsheet.

Figure 13:
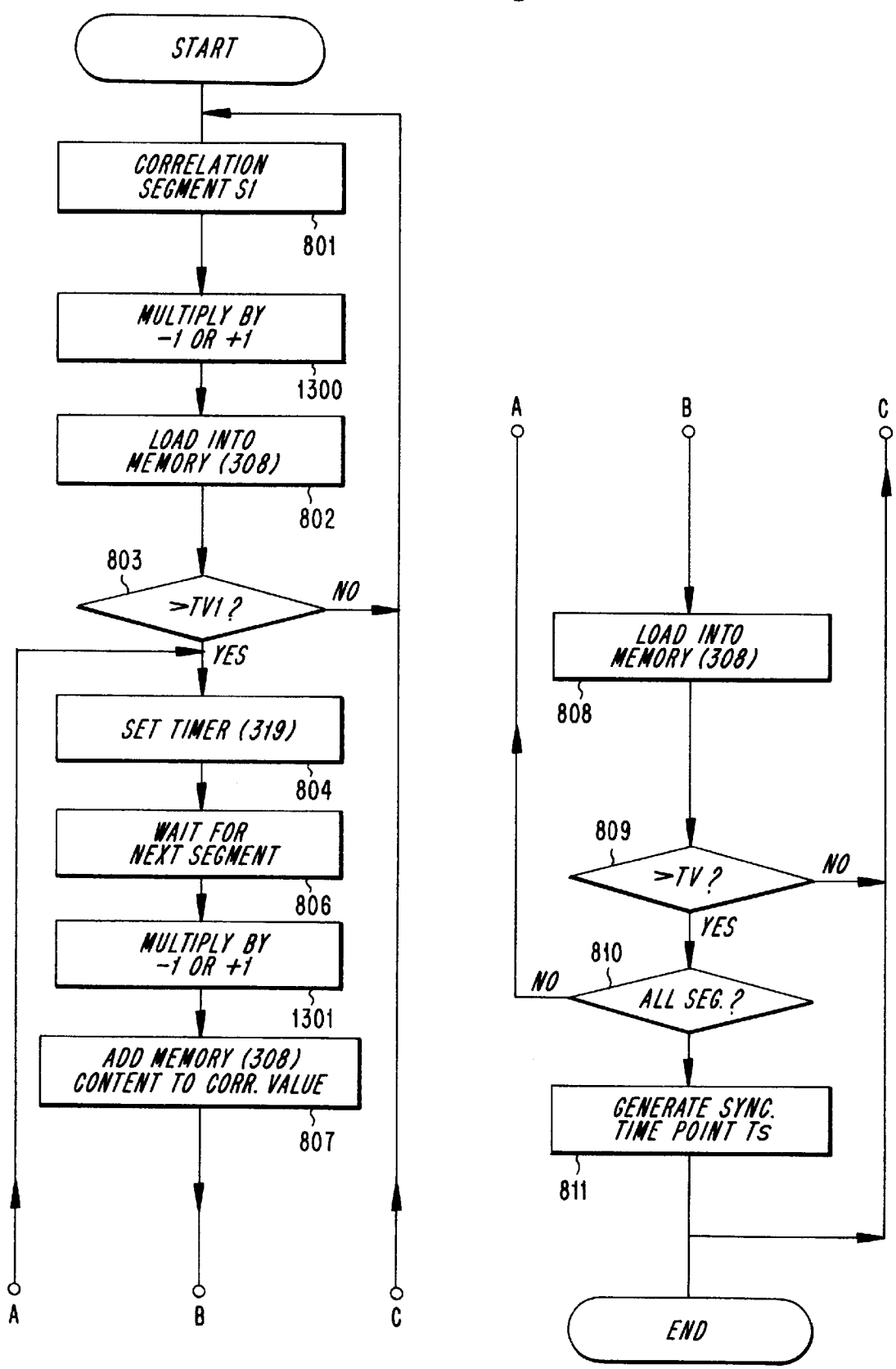
FIG. 13 is a flowsheet which illustrates an alternative embodiment of the sequential correlating procedure.

FIG. 13 illustrates schematically the manner in which the arrangement shown in FIG. 9 receives a signature. Firstly, segment S1 is correlated in a step 801, and the correlation value a1 is multiplied in a step 1300 with +1 or −1, so as to obtain a positive correlation value. The product of the multiplication is loaded into the memory 308 in step 802.

Steps 801, 1300 and 802 are repeated for each of the segments that does not exceed the threshold value corresponding to the first segment S1, this being checked in a step 803. When segment S1 is assumed to have been received, implying that the magnitude of the correlation value a1 exceeds the threshold value TV1 corresponding to the first segment, the timer is charged in a step 804 with a value that corresponds to a time point t1a at which the product of the correlation value a2 of segment S2 and one of the coefficients +1 or −1 shall be added to the correlation value a1 of segment S1. In step 806, the arrangement waits for the correlation value a2 of segment S2 to be obtained. When the correlation value a2 of segment S2 is obtained, this value is multiplied by +1 or −1 in a step 1301. The product is added in a step 807 to the value a1 in the memory 308, and the sum a1+a2 of said addition is loaded into the memory 308 in a step 808. The aforementioned sum a1+a2 is compared in a step 809, to ascertain whether or not said sum exceeds the threshold value TV2 corresponding to the second segment.

If, in accordance with a No alternative, the threshold value is not exceeded, the procedure returns to step 801 and, in accordance with a Yes alternative a further check is made to ascertain whether or not all segments have been received, in step 810. If not all of the segments have been received, in accordance with the No alternative, a return is made to step 804. Steps 804, 806, 1301, 807, 808, 809 and 810 are carried out until all segments have been received in accordance with a Yes alternative in step 810, and accepted in step 809, wherewith the sync. time pulse signal Ts is generated in step 811, wherewith the detection procedure is complete. A return is then made to step 801 and a new signature awaited.

Figure 14:
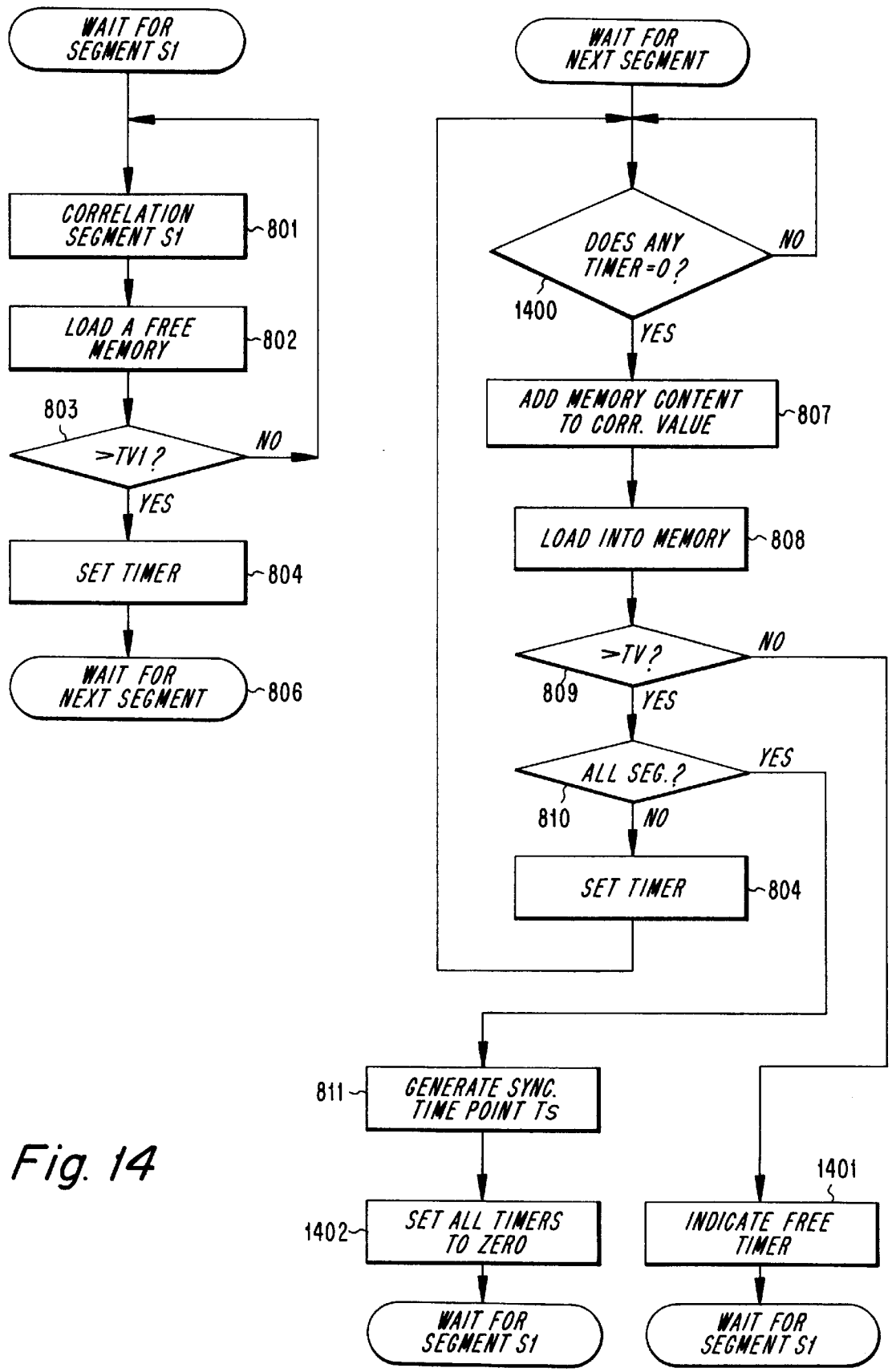
FIG. 14 is another flowsheet illustrating the sequential correlating procedure.

The procedure followed by the arrangement illustrated in FIG. 10 will now be explained in simple terms with reference to FIG. 14. The FIG. 10 arrangement includes several counters, timers and memories. The respective status of the various counters, timers and memories is symbolized in FIG. 14 by two different states, i.e. "wait for segment S1" and "wait for the next segment". Those counters, timers and memories that have the state "wait for segment S1" are free to be used to detect signatures. One counter, one timer and one memory switches to the state "wait for the next segment" when they have been allocated for detection, which takes place when the first correlation value al has exceeded the first threshold value TV1. Counters, timers and memories that occupy the states "wait for the next segment" switch to the state "wait for segment S1" when a signature is detected. When a threshold value is not exceeded in a preceding detection process, the counter, timer and memory that were used for precisely this detection switch from the state "wait for the next segment" to the state "wait for segment S1". This counter, timer and memory then becomes available for a new detection process. This is, in principle, the same procedure as that described with reference to FIG. 13, although with the exception that several detections of possible signatures can be effected simultaneously. This can be effected with or without segment inversion coefficients. With regard to blocks 801–811, reference is made to the description of FIGS. 8 and 13. In a step 1400, it is decided whether a timer is down-counted to 0, so that the correlation value is added in accordance with a Yes alternative. In a step 1401, it is indicated that a timer is idle, i.e. can be used for the detection of a new possible signature, while in a step 1402 all timers are set to zero or cleared, subsequent to having generated the sync. time pulse signal Ts.

It has been said in the aforegoing that the values are loaded into the memory prior to making the comparison with respective threshold values. This is, however, not necessary. The procedure can be caused to involve fewer steps, by first making the comparison with respective threshold values and only loading into the memory those threshold values that are exceeded according to the comparison. This procedure also further lowers power consumption.

Figure 15:
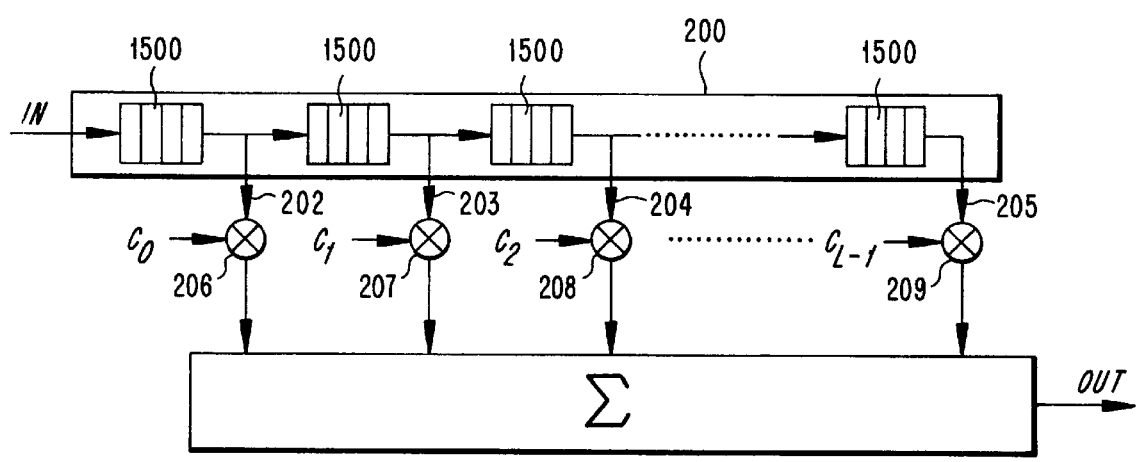
FIG. 15 is a block schematic illustrating the correlator where consideration has been paid to the sampling point.

The sampling points in the individual bits in the received bit stream have not been taken into consideration in the aforedescribed arrangements and procedures. In reality, however, each bit has a certain form and for this reason sampling will preferably lie in the centre of each bit in the bit stream. The sampling time is not known in applications with correlators described above, and it is therefore preferred to correlate against different sampling points in the bit stream. In determining the best sampling point, it is normal to over-sample the received sequence K times (K normally being 4 or 16). FIG. 5 shows a correlator that executes four correlations with each bit (K=4), instead of one correlation with each bit as described above. The time delay units 220, 221, 222, 223 have been quadrupled between each output 202, 203, 204, 205 in the shift register 200, meaning that each bit in the sequence will be multiplied by the correlation coefficients $C_0, C_1, \ldots, C_{LS-1}$ four times. When the correlator shown in FIG. 15 is part of the sequential correlator, such as the correlator shown in FIG. 3, everything is executed four times more quickly. The new time delay units 1500 are shown in FIG. 15. The timers in the timer unit 1001 now include different time references for the bit phase, and also for the sampling phase.

Alternatively, K parallel correlators can be used to correlate against different sampling points. Each correlator is then executed at normal symbol rates.

I claim:

1. A method of detecting a symbol sequence in asynchronous reception, using a known digital sequence, comprising the steps of:

a) dividing the known digital sequence into at least two separate segments;

b) allocating a number of specific threshold values equal to the number of said segments;

c) correlating said received symbol sequence and the first segment of the known digital sequence, therewith to obtain a first correlation value;

d) storing said first correlation value at least when said value exceeds a first of said threshold value;

e) setting a certain first time point in accordance with the length of the second segment;

f) correlating said received symbol sequence and the second segment of the known digital sequence at said first time point, therewith to obtain a second correlation value;

g) adding said second correlation value to the stored first correlation value so as to obtain a first summation value; and h) comparing said first summnation value with a second of said threshold values, wherewith an indication that said symbol sequence has been detected is obtained when said sum exceeds said second threshold value.

2. A method according to claim 1, in which said known digital sequence is divided into more than two segments and further comprising the steps of:

repeating step d) with storing of said first summation value at least when said value exceeds the threshold values of the second threshold value;

repeating step e) by setting a second time point in accordance with the length of the third segment;

repeating step f) for the third segment at said second time point, therewith to obtain a third correlation value;

repeating step g) by adding said third correlation value to said first summation value, such as to obtain a second summation value;

repeating step h) for said second summation value and a third threshold value; and repeating said steps d), e), f), g) and h) for a number of times corresponding to the number of divided segments in said digital sequence.

3. A method according to claim 1, further comprising:

repeating step d) up to and including step h) until the last segment in the digital sequence has been correlated; and generating a sync. time pulse signal in conjunction with a last summation value having exceeded a last threshold value.

4. A method according to claim 1, further comprising:

dividing the known digital sequence into segments of mutually different lengths; and allotting new correlation coefficients prior to each correlation.

5. A method according to claim 1, further comprising:

dividing the known digital sequence into segments of mutually equal lengths.

6. A method according to claim 1, further comprising:

allocating different bit patterns to said segments; and allocating new correlation coefficients prior to each correlation.

7. A method according to claim 5, further comprising the step of:

allocating the same bit patterns to said segments.

8. A method according to claim 5, further comprising the step of:

allocating a certain bit pattern to a portion of the segments; and allocating an inverted version of the same bit pattern to remaining segments, such as to obtain a specific segment sequence.

9. A method according to claim 8, wherein the segment sequence is a so-called maximum length code.

10. A method according to claim 8, wherein the segment sequence is a so-called Gold sequence.

11. A method according to claim 8, wherein the segment sequence is a so-called Barker sequence.

12. A method according to claim 7, wherein when at least the first correlation value has exceeded the first threshold value of said threshold values, characterized by the steps of effecting a new correlation in accordance with steps c) and f) in another part of the received symbol sequence that is received later than that part of the symbol sequence for which correlation has already commenced in accordance with steps c) and f), wherein repeated correlation values are obtained, these values being stored and added in accordance with steps d) and g) and compared in accordance with step h) with respective threshold values subsequent to having set said time point in accordance with step e), whereby attention is paid to any true symbol sequence received after an earlier detected false symbol sequence.

13. A method according to claim 12, further comprising the step of:

zero-setting (1402) at least one timer subsequent to generation of the sync. time pulse signal.

14. A method according to claim 1, wherein the bit pattern of the segments is a so-called maximum length code.

15. A method according to claim 1, wherein the bit pattern of the segments is a so-called Gold sequence.

16. A method according to claim 1, wherein the bit pattern of the segments is a so-called Barker sequence.

17. An arrangement for detecting a symbol sequence in asynchronous reception, using a known digital sequence, comprising:

at least one correlator which functions to correlate the received symbol sequence and the segments of the known digital sequence, therewith to obtain first and second correlation values;

at least one memory for storing the first correlation value, at least when said correlation value exceeds a first threshold value;

at least one adder which functions to add the second correlation value to said stored correlation value, such as to obtain a first summation value;

at least one timer for setting a certain time point; and a control unit which functions to compare the first correlation value with the first of said threshold values for setting said timer, and for comparison of the first summation value with a second of said threshold values, wherewith an indication is obtained that said symbol sequence has been detected when the first summation value exceeds said second threshold value.

18. An arrangement according to claim 17, wherein in that said correlator functions to correlate the received symbol sequence and the segments of the known digital sequence subsequent to said first and said second correlation values having been obtained, therewith to obtain third and fourth correlation values;

in that said memory functions to store the summation values of said correlation values, at least when the summation values exceed said threshold value;

in that said adder functions to add said correlation values to said stored summation values such as to obtain new summation values, said new summation values being stored in said memory;

in that at least one timer is included for setting certain time points; and in that the arrangement includes a control unit for setting said timer and for comparison of said new summation values with said threshold values and indicating when said symbol sequence has been detected, which is obtained when the threshold values have been exceeded by respective summation values.

19. An arrangement according to claim 18, wherein the control unit functions to allocate new correlation coefficients prior to each correlation.

20. An arrangement according to claim 17, wherein a multiplier for multiplying the correlation values with a specified coefficient such as to obtain a segment correlator.

21. An arrangement according to claim 17, wherein an adder-memory-multiplier unit and a timer unit which function to support simultaneous correlation of possible symbol sequences; and in that the arrangement includes an address bus which is arranged so that an address given by the control unit controls the selection of active units.

22. An arrangement according to claim 21, wherein the function unit also functions to set to zero at least one timer in the timer unit when the symbol sequence has been detected.

* * * * *